(12) United States Patent
Benco et al.

(10) Patent No.: US 7,319,861 B2
(45) Date of Patent: Jan. 15, 2008

(54) NETWORK INITIATED AUTO-REDIAL

(75) Inventors: David S. Benco, Winfield, IL (US);
Kevin J. Overend, Elmhurst, IL (US);
Baoling S. Sheen, Naperville, IL (US);
Sandra Lynn True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1100 days.

(21) Appl. No.: 10/602,585

(22) Filed: Jun. 24, 2003

(65) Prior Publication Data
US 2004/0266405 A1   Dec. 30, 2004

(51) Int. Cl.
*H04M 3/42* (2006.01)
(52) U.S. Cl. .............................. 455/414.1; 455/414.3; 455/418; 379/352
(58) Field of Classification Search ............. 455/414.1, 455/414.3, 418, 420, 507, 510, 564, 567; 379/69–70, 92.01, 352
See application file for complete search history.

(56) References Cited

U.S. PATENT DOCUMENTS 5,727,047 A * 3/1998 Bentley et al. .......... 379/93.05
6,035,031 A * 3/2000 Silverman ............... 379/209.01
7,158,617 B2 * 1/2007 Brandt ........................ 379/52
2003/0086540 A1 * 5/2003 Brandt ........................ 379/52
2004/0179655 A1 * 9/2004 Brandt ........................ 379/52

FOREIGN PATENT DOCUMENTS

WO   WO 02/100050 A1 * 12/2002

* cited by examiner

*Primary Examiner*—Binh K. Tieu

(57) ABSTRACT

Network initiated auto redialing is based on an auto redial duration selected or entered by a calling party. An auto redial interval or retry rate may also be selected or entered by the calling party. If the calling party is unavailable when a connection is established with a called party, a message is played or sent to the called party explaining that the call is an auto redial call. The message may explain that the calling party is now unavailable. Additionally, the message may include identifying information regarding the calling party. For example, the message may include a directory number of the calling party.

28 Claims, 5 Drawing Sheets

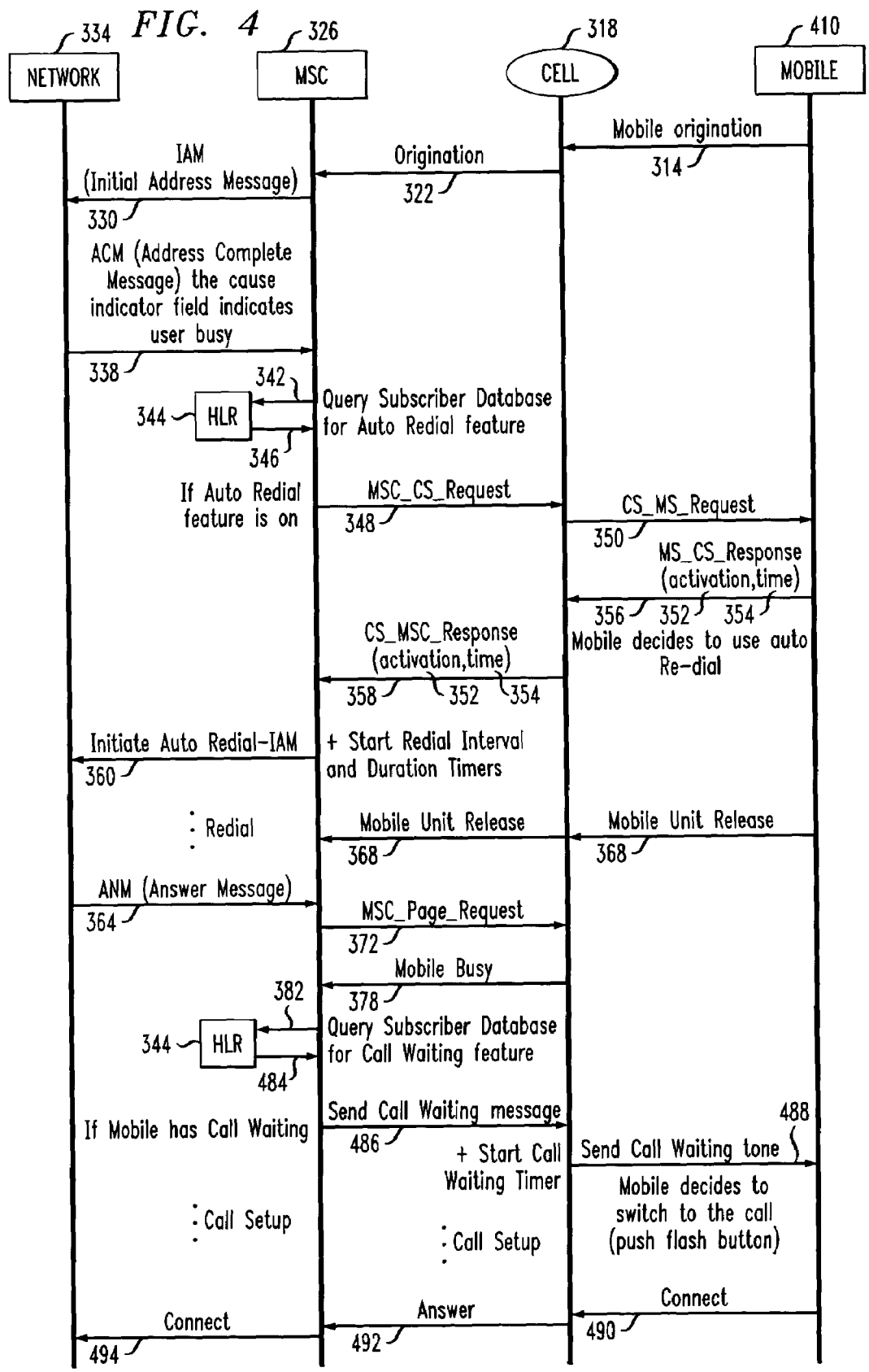

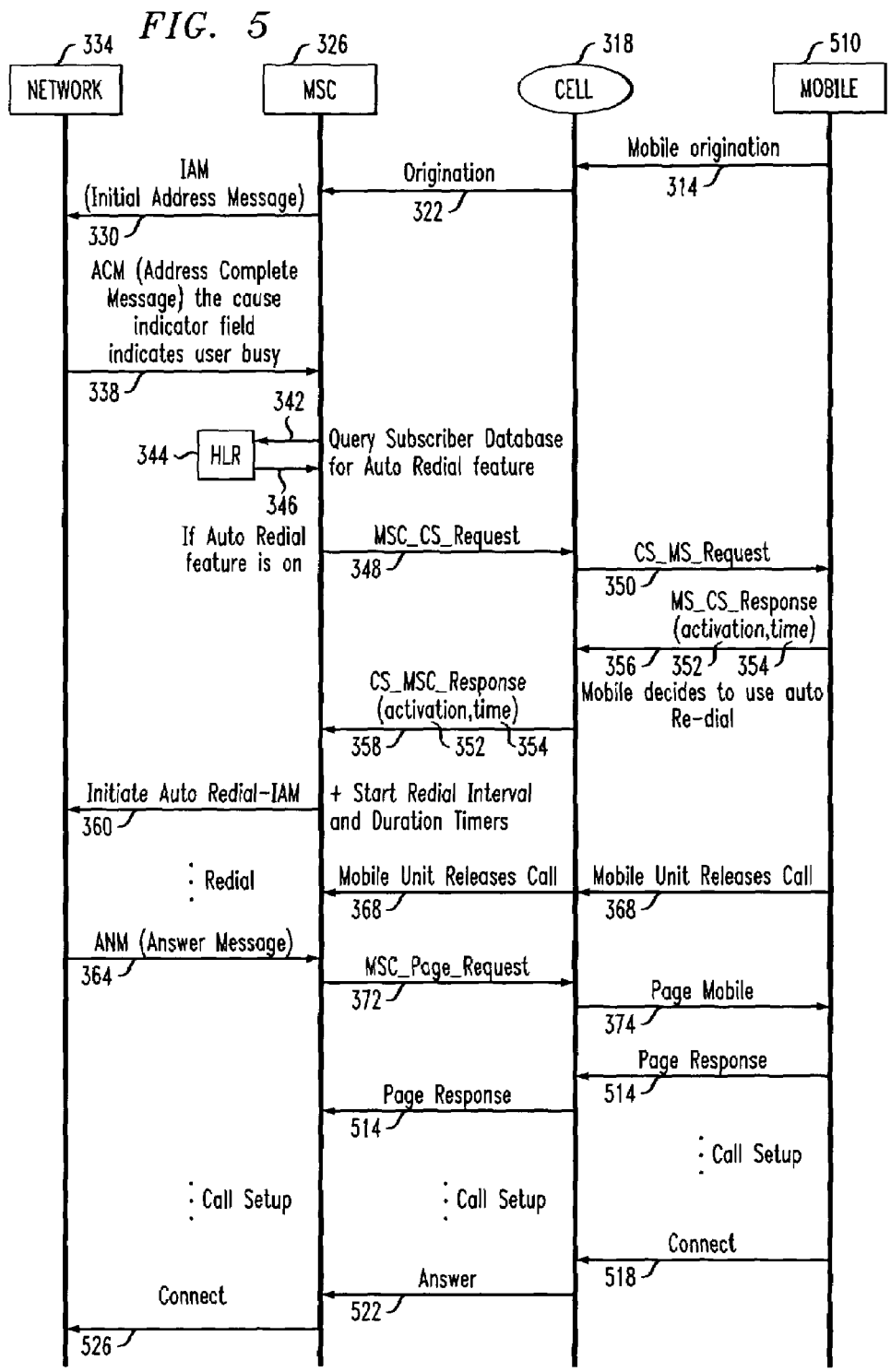

NETWORK INITIATED AUTO-REDIAL

BACKGROUND OF THE INVENTION

The invention is related to the art of telephone call redialing. The invention will be described in terms of mobile communications network initiated automatic redialing. However, the invention may be applied in other calling environments. For example, the invention may be applied to wired telephone networks.

When placing a telephone call, it is not uncommon to receive a busy signal or to be otherwise informed that the called party or user equipment of the called party is unavailable for completion of the call. In these situations, it is sometimes possible to leave a recorded message for the called party. However, in other situations, a message recording service or device is unavailable or inappropriate. In these situations, the calling party has few options other than to try the call again at a later time.

Some user equipment and network features have been developed to make this task easier. For example, many phones include a redial button. The last number dialed is stored in a memory of the telephone. Pressing the redial button causes the last set of digits dialed to be automatically redialed. This feature allows the calling party to check periodically to see if the called party or the user equipment of the called party is available to receive the call.

Some telephone networks can be configured to automatically redial the number of the called party and to alert the user equipment of the calling party when a connection to the called party is established.

However, these redialing solutions have drawbacks. Using the redial button requires the calling party to interrupt other activities each time redialing is initiated. For example, if it is urgent that the calling party reach the called party, the calling party may be forced to redial every minute, thereby making it difficult to make another call or to carry out any other task. Currently available network based redial systems don't allow the calling party to set a duration for which redialing attempts are to be made, nor do they allow the calling party to select a redial interval or frequency with which redial attempts are to be made. Furthermore, if the calling party is unavailable when the network establishes a connection to the called party, the called party hears only silence when answering the auto dial call and may be left with the impression that he or she is the victim of a prank or harassing phone call.

Therefore, there is a desire for a system and method of network initiated auto redialing that allows the calling party to select an appropriate redial interval and redial duration thereby reducing the chance that the call will be completed when the calling party is unavailable. Additionally, there is a desire for a system and method of network initiated auto redialing that informs the called party of the purpose of the call should the call be completed when the calling party is unavailable.

SUMMARY OF THE INVENTION

A method for providing auto redial services to a calling party includes receiving a call request from the calling party, extracting calling party and called party identifying information from the call request, attempting to terminate the call to the called party based on the extracted called party identifying information, determining that user equipment of the called party is unavailable, determining a retry duration selected by the calling party, releasing the user equipment of the calling party, starting a retry duration timer which will expire when the selected retry duration has elapsed, reattempting to terminate the call to the called party until the call to the called party is successfully terminated or the retry duration timer expires, successfully terminating the call to the called party, and, attempting to alert the user equipment of the calling party.

The method can further include determining that the calling party is unavailable, and sending an announcement message to the called party explaining that the call is an auto redial call and that the calling party is now unavailable.

Determining a retry duration selected by the calling party can include, for example, retrieving a pre-provisioned retry duration selected by the calling party from a subscriber database of the calling party, or, sending a message to the calling party requesting the retry duration be entered through the use of the user equipment of the calling party and receiving the retry duration entry from the user equipment of the calling party.

Determining that the calling party is unavailable can include receiving a mobile busy response message from a cell site serving user equipment of the calling party. If the calling party subscribes to call waiting determining that the calling party is unavailable can include playing a call waiting signal for the calling party, and determining that the calling party is not going to respond to the call waiting signal.

Reattempting to terminate the call to the called party can include determining a retry interval selected by the calling party and reattempting with a retry frequency based on the selected retry interval.

Determining the retry interval selected by the calling party can include, for example, retrieving a pre-provisioned retry interval selected by the calling party from a subscriber database of the calling party, or, sending a message to the calling party requesting the retry interval be entered through the use of the user equipment of the calling party, and, receiving the retry interval entry from the user equipment of the calling party.

Some embodiments include a method for providing auto redial services to a calling party using mobile user equipment. The method includes receiving, at an MSC, a origination message including calling party and called party identification information, receiving, at the MSC, an indication that user equipment of the called party is unavailable, transmitting, from the MSC, a message requesting an indication as to whether an auto redial service is desired, receiving, at the MSC, an indication that auto redial service is desired, transmitting, from the MSC, a message requesting a retry duration specified by the calling party, receiving, at the MSC, a calling party specified retry duration, releasing the user equipment of the calling party for other uses, reattempting repeatedly, for a period of time not to exceed the calling party specified retry duration, to terminate the call to the called party, attempting to alert the user equipment of the calling party if one of the reattempts is successful, and, terminating a call between the calling party and the called party if the attempt to alert the user equipment of the calling party is successful.

Some embodiments further include determining that the calling party is unavailable and sending an announcement message to the called party explaining that the call is an auto redial call and that the calling party is now unavailable.

Determining that the calling party is unavailable can include receiving, at the MSC, a mobile no page response message in regard to the user equipment of the calling party. Alternatively, determining that the calling party is unavailable can include receiving, at the MSC, a mobile busy response message from a cell site serving the user equipment of the calling party. Under those circumstances, in some embodiments, determining that the calling party is unavailable further includes playing a call waiting signal for the calling party, and determining that the calling party is not going to respond to the call waiting signal.

Reattempting to terminate the call to the called party can include receiving, at the MSC, a retry interval selected by the calling party, generating, within the MSC, a retry signal with a period associated with the selected retry interval, and sending, from the MSC, an IAM message each time the retry signal is generated.

For example, receiving, at the MSC, a calling party specified retry duration can include receiving, at the MSC, a pre-provisioned retry duration, selected by the calling party, from a subscriber database associated with the calling party. Alternatively, or additionally, receiving, at the MSC, a calling party specified retry duration can include sending a message to the calling party requesting a retry duration be entered through the use of the user equipment of the calling party, and, receiving, at the MSC, the retry duration entry from the user equipment of the calling party.

Receiving, at the MSC, a retry interval selected by the calling party can include receiving, at the MSC, a pre-provisioned retry interval from a subscriber database of the calling party. Alternatively, receiving, at the MSC, a retry interval selected by the calling party can include sending a message to the calling party requesting a retry interval be entered through the use of the user equipment of the calling party, and, receiving the retry interval entry from the user equipment of the calling party.

A system for providing auto redial services to a calling party includes means for receiving a call request from the calling party, means for extracting calling party and called party identifying information from the call request, means for attempting to terminate the call to the called party based on the extracted called party identifying information, means for determining that user equipment of the called party is unavailable, means for determining a retry duration selected by the calling party, means for releasing the user equipment of the calling party, means for starting a retry duration timer which will expire when the selected retry duration has elapsed, means for reattempting to terminate the call to the called party until the call to the called party is successfully terminated or the retry duration timer expires, means for successfully terminating the call to the called party, and, means for attempting to alert the user equipment of the calling party.

Some embodiments also include means for determining that the calling party is unavailable, and means for sending an announcement message to the called party explaining that the call is an auto redial call and that the calling party is now unavailable.

The means for determining a retry duration selected by the calling party can include means for retrieving a pre-provisioned retry duration selected by the calling party from a subscriber database of the calling party. Alternatively, or additionally, the means for determining the retry duration selected by the calling party can include means for sending a message to the calling party requesting the retry duration be entered through the use of the user equipment of the calling party, and, means for receiving the retry duration entry from the user equipment of the calling party.

The means for determining that the calling party is unavailable can include means for receiving a mobile busy response message from a cell site serving user equipment of the calling party. Additionally, the means for determining that the calling party is unavailable can include means for playing a call waiting signal for the calling party, and, and means for determining that the calling party is not going to respond to the call waiting signal.

The means for reattempting to terminate the call to the called party can include means for determining a retry interval selected by the calling party, and, means for reattempting with a retry frequency based on the selected retry interval.

The means for determining the retry interval selected by the calling party can include means for retrieving a pre-provisioned retry interval selected by the calling party from a subscriber database of the calling party. Alternatively, or additionally, the means for determining the retry interval selected by the calling party can include means for sending a message to the calling party requesting the retry interval be entered through the use of the user equipment of the calling party, and, means for receiving the retry interval entry from the user equipment of the calling party.

DESCRIPTION OF THE DRAWINGS

The invention may take form in various components and arrangements of components, and/or in various procedures and arrangements of procedures. The drawings are only for purposes of illustrating preferred embodiments, they are not to scale and are not to be construed as limiting the invention.

FIG. 4 is a call flow diagram summarizing the operation of the system for performing the method of FIG. 1 under a second call scenario.

FIG. 5 is a call flow diagram summarizing the operation of the system for performing the method of FIG. 1 under a third call scenario.

DETAILED DESCRIPTION OF THE PREFERRED EMBODIMENTS

Figure 1:
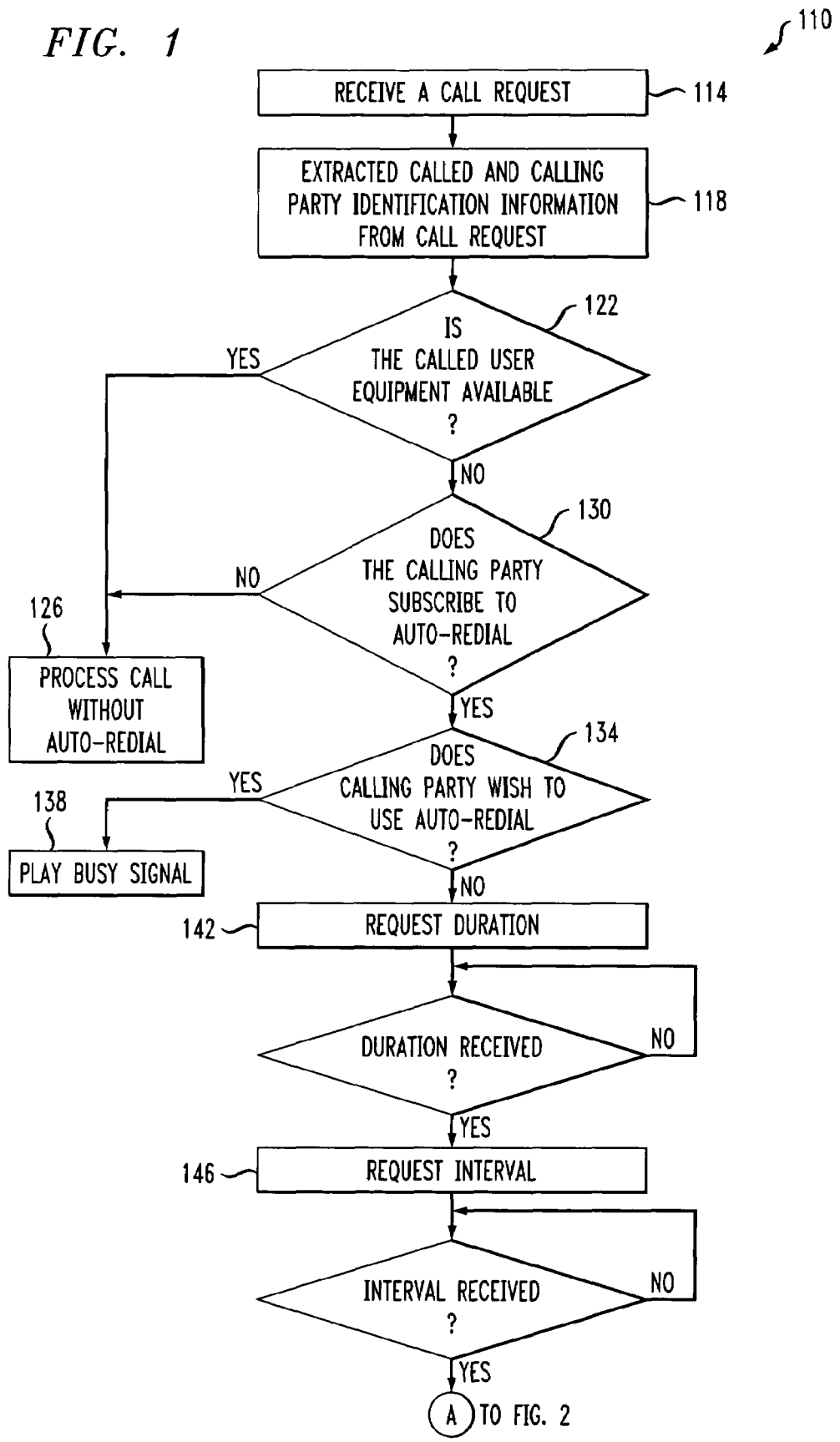
FIG. 1 and FIG. 2 are first and second parts of a flow chart summarizing a method for providing auto redial services to a calling party.
Figure 2:
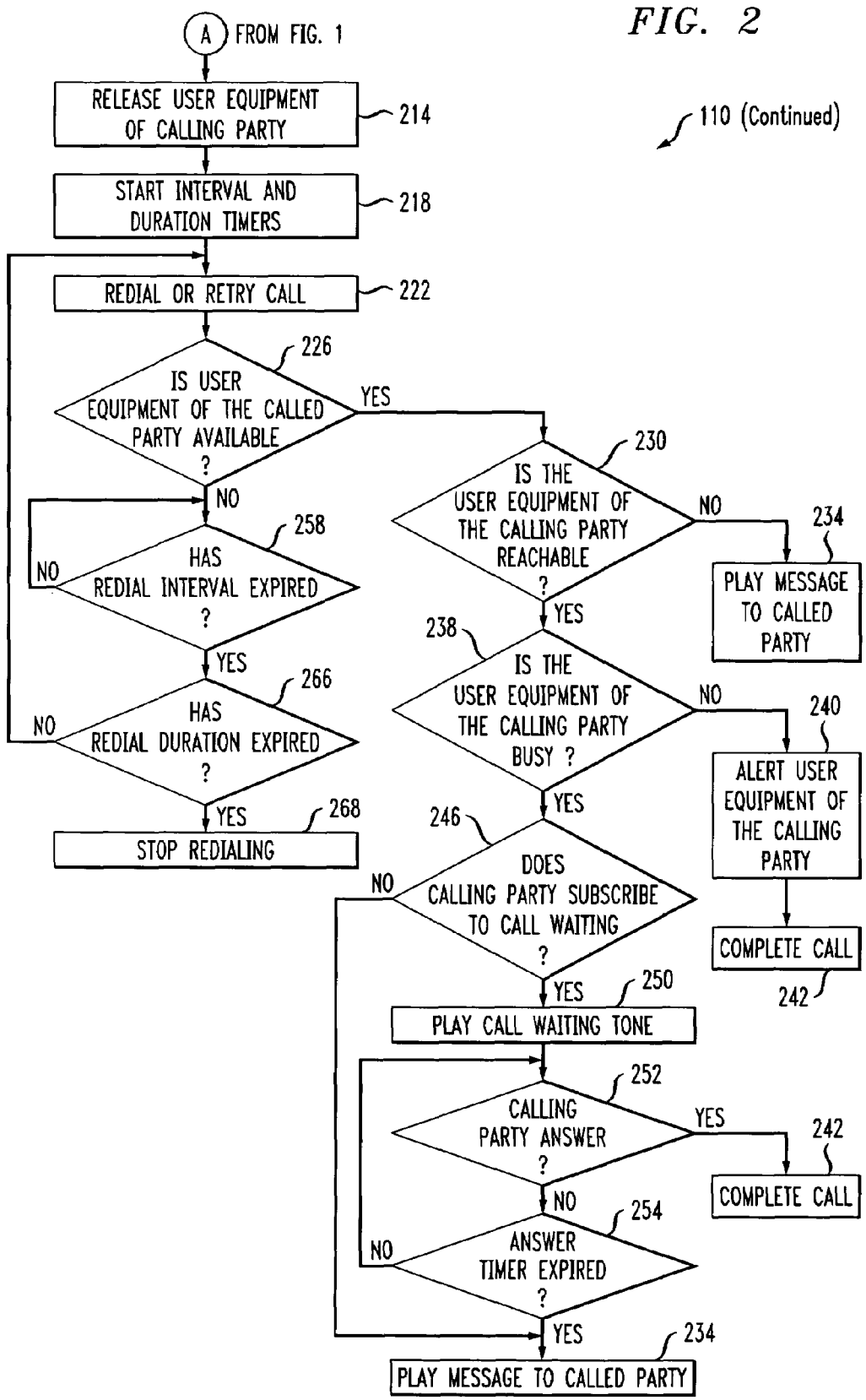

Referring to FIG. 1 and FIG. 2, a method 110 for network initiated auto redialing may begin when a call request is received 114 (for example, at Switching Center) and called and calling party identification information is extracted 118 from the received 114 call request. The called party identification information is used in a determination 122 as to whether user equipment of the called party is available for completing the call.

If the user equipment of the called party is available, there is no need for auto redialing and the call is processed 126 without auto redialing. However, if the user equipment of the called party is unavailable, for instance, because the user equipment is currently offline or shut off or because the user equipment is currently in use (busy), then a determination 130 may be made as to whether or not the calling party subscribes to an auto redial feature. For example, the Switching Center may make the determination 130 by accessing a subscriber database associated with the calling party. If the calling party does not subscribe to auto redialing, then the call is processed without auto redialing 126. For example, the calling party is played a busy signal. Of course, if auto redialing is a standard feature available to all calling parties then the determination 130 may be skipped.

If the calling party does subscribe to an auto redial service or such a service is available to all calling parties then a determination 134 is made as to whether the calling party wishes to use the auto redial feature in the present call. If the calling party does not wish to use auto redialing in the present call then the call is processed without auto redialing. For example, a busy signal is played 138 for the calling party or the call is ended, thereby releasing the user equipment of the calling party for use in another task. If the calling party does wish to use auto redialing in the current call then an auto redial duration is requested 142. For instance, a subscriber database may be accessed (for example my the Switching Center) to determine a redial duration selected by the calling party. Alternatively, an announcement or menu selection message is sent to the user equipment of the calling party and the calling party enters a redial duration through a numeric keypad, voice recognition or other means. For example, the calling party may want the network to attempt to complete the requested call for the next hour or for only the next fifteen minutes. For instance, the calling party may know that he or she will be unavailable to complete the call after a period of fifteen minutes. Therefore, the calling party enters or selects the fifteen minute retry duration.

A retry interval may also be requested 146. For example, a predefined retry interval selected by the calling party may be requested from a subscriber database. Alternatively, an announcement or retry interval selection menu may be presented to the calling party. For instance, a charge may accrue for each retry attempt. Therefore, the calling party may decide that retrying or redialing once every ten minutes is sufficient. On the other hand, if the call is very urgent, the calling party may determine that the call should be redialed every ten seconds. Once a calling party selected retry interval is received, the user equipment of the calling party is released 214 for other uses. For example, the calling party may hang up. Alternatively, the network may issue a disconnect command or message.

Redial duration and redial interval timers are started 218 (for example, the timers are implemented within the Switching Center) and the network redials or retries 222 to establish a connection with the user equipment of the called party. A determination 226 is made as to whether the user equipment of the called party is available to complete the call. If 226, the user equipment of the called party is available, the user equipment of the called party is alerted and a determination 230 is made as to whether the user equipment of the calling party is reachable. If the user equipment of the calling party is not reachable, because, for example, the calling party is no longer connected to the network, because, for example, the calling party is out of range of a network cell site or because user equipment of the calling party has been turned off, then when the user equipment of the called party goes off hook in response to the alert, an explanatory message is played 234 to the called party. For example, the message explains that the call is an auto redial call and that the calling party is no longer available. Additionally, the message may include a directory number of the calling party and/or a name or other identification of the calling party.

If 230, the user equipment of the calling party is reachable, a determination 238 is made as to whether the user equipment of the calling party is busy. If the user equipment of the calling party is not busy, the user equipment of the calling party is alerted 240 and the call is completed 242 or terminated between the calling and called parties. If 238, the user equipment of the calling party is busy, a determination 246 is made as to whether the calling party subscribes to a call waiting feature. If 246, the calling party does not subscribe to a call waiting feature, a message is played 234 to the called party if and when the user equipment of the called party goes off hook. As explained above, the message explains that the call is an auto redial call and that the calling party is no longer available. If 246 the calling party does subscribe to call waiting, a call waiting tone is played 250 for the calling party. If the calling party responds to the call waiting tone and answers the call, the call is completed 242 as described above. If after a reasonable period of time it is determined 254 that the calling party is not going to respond or has not responded to the call waiting tone, the explanatory message 234 is played to the called party.

If 226, the user equipment of the called party is not available, a determination 258 is made as to whether the redial interval has expired. When 258, the redial interval has expired, a determination 266 is made as to whether the redial duration has expired. If the redial duration has not expired, the call is redialed 222, the redial interval timer is restarted and the determination 226 as to whether the user equipment of the called party is available is made once again. If the redial duration has expired, redialing stops 268.

Figure 3:
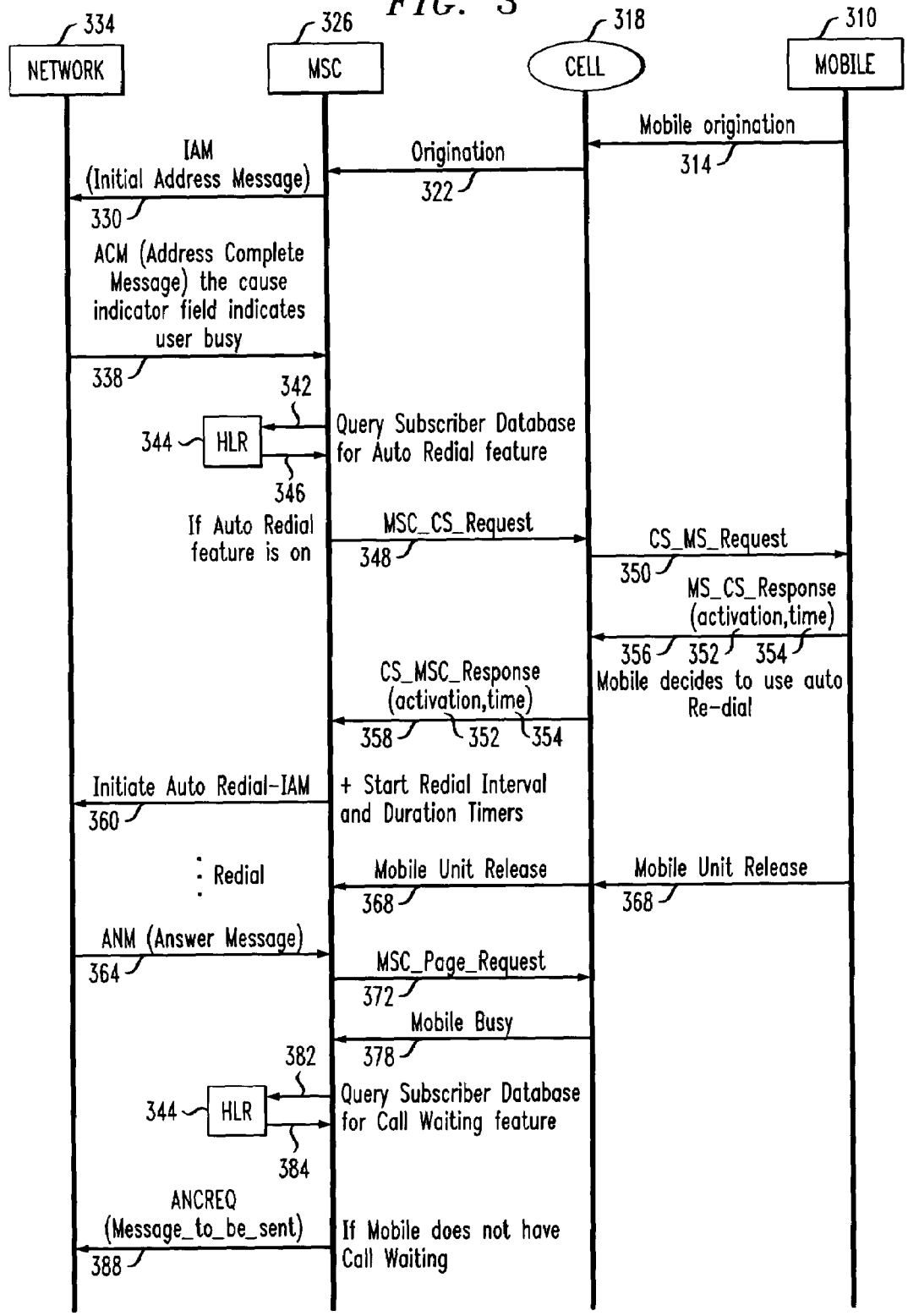
FIG. 3 is a call flow diagram summarizing the operation of a system for performing the method of FIG. 1 under a first call scenario.

For example, referring to FIG. 3, a calling party uses a mobile phone 310 to place a call to a called party (not shown). The mobile phone 310 generates a mobile origination message 314, which is transmitted to a cell site 318 serving the mobile phone 310. The cell site 318 transmits a related origination message 322 to a Mobile Switching Center (MSC) 326. The Mobile Switching Center receives 114, the origination message 322 as a call request. The MSC 326 extracts 118 called party identification information from the origination message 322 and attempts to determine 122, whether the user equipment of the called party is available for completing the requested call by transmitting, for example, an initial address message (IAM) 330 over a network 334 connecting the MSC 326 to the user equipment of the called party. In this scenario, the network 334 responds with an address complete message (ACM) 338 including a parameter value, in for example, a cause indicator field, indicating that the user equipment of the called party is currently in use or busy. The MSC 326 receives this indication that the user equipment of the called party is busy and thereby completes the determination 122, that the user equipment of the called party is not available. Therefore, the MSC 326 attempts to determine 130 whether the calling party subscribes to an auto redial service.

For instance, the MSC 326 queries 342 a subscriber database located, for example, in a Home Location Register (HLR) 344. The subscriber database transmits a query response message 346 to the MSC 326 indicating that the calling party does subscribe to an auto redial feature. Therefore, the MSC 326 attempts to determine 134, whether the calling party wishes to use auto redialing in the current call. The MSC 326 transmits a query to the cell site 318 in the form of an MSC to Cell Site request message 348. The cell site 318 relays the query to the mobile station 310 in the form of a Cell Site to Mobile Station request message 350. The queries of 348, 350 may be in the form of synthesized or recorded voice messages or text messages to be played or displayed on the user equipment of the calling party (e.g. 310). The queries 348, 350 may simply ask if auto redial is to be used or they may additionally ask for a redial duration 142 and/or a redial interval 146. Alternatively, the user selected redial duration and/or interval may be requested 142, 146 and received from the subscriber database in the query response message 346 or as a response to a second subscriber database query (not shown). For example, the MSC 326 may send a second subscriber database query instead of or in addition to the query messages 348, 350 described above.

In this first scenario, the calling party responds to the query message 350 by indicating that auto redialing is desired and by entering or selecting a redial duration time. The mobile phone 310 accepts these entries and includes them as an activation 352 and time 354 parameter in a Mobile Station to Cell Site response message 356, which is transmitted to the Cell Site 318. The Cell Site 318 includes the parameters 352, 354 in a Cell Site to MSC response message 358, which is sent or transmitted to the Mobile Switching Center 326. Having thus determined 134, if the calling party wishes to use the auto redialing feature, the Mobile Switching Center starts 218 redial interval and duration timers. For instance, a redial interval preselected by the calling party may have been included in the query response message 346 or may have been included as a response to a database query (not shown). Alternatively, a redial interval may have been specified as a response to the query messages 348, 350 as an additional parameter in the response messages 356 and 358.

The MSC 326 initiates auto redialing by retrying or redialing the call 222. Retrying or redialing 222 may begin immediately or upon the first expiration 258 of the retry or redial interval timer. With each retry 222 the MSC 326 sends or transmits an LAM message 360. The network 334 responds to each IAM message with an Address Complete Message (not shown) indicating that the user equipment is unavailable or busy, until of course, a connection is completed. At that point, the network 334 responds with an Answer Message (ANM) 364.

After responding 356 to the request message 350, the calling party or the MSC may end the current call. For example, the mobile user hangs up and the mobile phone 310 sends a mobile unit release message 368 to the cell site 318. The mobile unit release message 368 is relayed to the Mobile Switching Center 326.

If and when the Mobile Switching Center receives the ANM message 364 indicating that a connection has been established between the MSC 326 and the called party or the user equipment of the called party, the MSC 326 attempts to reestablish a connection to the user equipment of the calling party or mobile 310 by sending an MSC_Page_Request message 372 to the cell site 318 or other appropriate cell site. The cell site 318 responds with a Mobile Busy message 378 to the MSC 326, thereby allowing the MSC to determine 230 that the user equipment of the calling party is reachable and to determine 238 that the user equipment of the calling party is busy. Therefore, the MSC 326 sends a query 382 to the Home Location Register 344 of the calling party to determine 246 if the calling party subscribes to a call waiting feature. In the illustrated scenario, the HLR 344 transmits a response message 384 to the MSC 326 indicating that the calling party does not subscribe to call waiting. Therefore, the MSC 326 transmits an Announcement Request message (ANCREQ) 388 to the network 334, directing the network to play or send 234 an explanatory message to the called party. For instance, the message indicates that the call is an auto redial call but that the calling party is no longer available. The message may further indicate an identity of the calling party and/or a directory number of the calling party.

Referring to FIG. 4, in a second scenario, a second calling party uses a second mobile phone or user equipment 410 to place a call. As described in reference to FIG. 3, the call generates a mobile origination message 314, an origination message 322, and an IAM message 330 transmitted or sent from the mobile calling party user equipment 410 to the cell site 318, from the cell site 318 to the MSC 326 and from the MSC 326 to the network 334 respectively. The network 334 responds with an ACM message 338 indicating that the called party or the user equipment of the called party is busy. Again the MSC queries 342, a subscriber database, to determine 130 if the calling party subscribes to an auto redial feature. The subscriber database responds 346 with an indication that the calling party does subscribe to auto redial. The MSC requests 142 an auto redial duration with an MSC to Cell Site request message 348. Alternatively, the MSC 326 might make the request of the subscriber database. Again the cell site 318 relays the request message 348 from the MSC 326 in the Cell Site to Mobile Station request message 350. The calling party responds either by voice or keyboard entry with an auto redial activation command and an auto redial duration. The user equipment of the calling party 410 generates the Mobile Station to Cell Site response message 356 including parameters indicating auto redial activation 352 and a redial duration time 354. The request 348, 350 may have also requested a retry interval selection. In that case, the mobile station to cell site response message 356 would include an interval parameter as well. Alternatively, the information may be collected in a series of requests and responses.

Again, the cell site 318 generates and transmits or sends a Cell Site to MSC response message including the parameters (e.g. 352, 354). Once again, the MSC begins redialing or retrying 222 by transmitting or sending a series of IAM messages 360. The frequency of the IAM message transmission is determined by the selected or entered interval time. The retries continue for a duration not to exceed the redial duration time 354. Having received all the needed information, the MSC 326 or the calling party 410 may end the current call. For example, the mobile user hangs up and the mobile phone 410 sends a mobile unit release message 368 to the cell site 318. The mobile unit release message 368 is relayed to the mobile switching center 326.

If and when the network sends or transmits an ANM message 364 to the MSC, indicating a connection to the called party has been established, the MSC 326 sends or transmits an MSC_Page_Request message 372 to the appropriate cell site (e.g. 318).

Again, the mobile 410 is being used for another call and the cell site again sends the mobile busy message 378 to the MSC 326 indicating to the MSC 326 that the user equipment of the calling party is reachable 230 but is busy 238. Therefore, once again, the MSC 326 sends a query 382 to the subscriber database in order to determine if the calling party subscribes to call waiting.

In this scenario, the subscriber database sends or transmits a query response message 486 indicating that the calling party does subscribe to call waiting. Therefore, the MSC 326 sends a call waiting message 486 to the serving cell site (e.g. 318). The cell site sends or plays 250, 488 the call waiting tone to the mobile user equipment 410. The calling party answers the call waiting tone and the mobile user equipment 410 transmits a connect message 490 to the cell site. In turn, the cell site sends an answer message 492 to the MSC 326. This allows the MSC 326 to determine 252 that the calling party has answered. Therefore, the MSC 326 completes the call 242 by transmitting a connect message 494 to the network 334.

Referring to FIG. 5, in a third scenario a third calling party places a call using a third mobile device such as a mobile phone 510. Call processing proceeds in a manner similar to that described in reference to FIG. 3, up until the point that the MSC 326 and cell site 318 send or transmit respective pages 372, 374. In third scenario, the third mobile device 510 responds to the page 374 from the cell site 318 by transmitting a page response 514 to the cell site 318 and then the mobile device 510 rings or vibrates, etc. (alerts 240). The cell site 318 relays the page response 514 to the mobile switching center 326. The MSC 326 responds by orchestrating call set up procedures between the mobile 510 and the called party via the network 334 as is known in the art. At the end of call set up, the mobile transmits a connect message 518 to the cell site 318. The cell site 318 transmits an answer message 522 to the MSC 326 which in turn transmits a connect message 526 to the user equipment of the called party via the network 334, thereby completing the call 242.

The invention has been described with reference to preferred embodiments. Obviously, modifications and alterations will occur to others upon reading and understanding the present specification. For example, in the described embodiments most of the functions of the method 110 for network initiated auto redialing are orchestrated or performed by hardware and software included in a Switching Center, such as the Mobile Switching Center 326. It is to be understood that other embodiments may distribute the functions of the method 110 throughout a network or within other devices. The invention may be implemented in wired networks as well as, as described above, within mobile networks. It is intended that the invention be construed as including all such modifications and alterations insofar as they come within the scope of the appended claims or the equivalents thereof.

We claim:

1. A method for providing auto redial services to a calling party, the method comprising:
   receiving a call request from the calling party;
   extracting calling party and called party identifying information from the call request;
   attempting to terminate the call to the called party based on the extracted called party identifying information;
   determining that user equipment of the called party is unavailable;
   determining a retry duration selected by the calling party;
   releasing the user equipment of the calling party;
   starting a retry duration timer which will expire when the selected retry duration has elapsed;
   reattempting to terminate the call to the called party until the call to the called party is successfully terminated or the retry duration timer expires;
   successfully terminating the call to the called party; and,
   attempting to alert the user equipment of the calling party.

2. The method of claim 1 further comprising:
   determining that the calling party is unavailable; and,
   sending an announcement message to the called party explaining that the call is an auto redial call and that the calling party is now unavailable.

3. The method of claim 1 wherein reattempting to terminate the call to the called party comprises:
   determining a retry interval selected by the calling party; and,
   reattempting with a retry frequency based on the selected retry interval.

4. The method of claim 1 wherein determining a retry duration selected by the calling party comprises:
   retrieving a pre-provisioned retry duration selected by the calling party from a subscriber database of the calling party.

5. The method of claim 1 wherein determining the retry duration selected by the calling party comprises:
   sending a message to the calling party requesting the retry duration be entered through the use of the user equipment of the calling party; and,
   receiving the retry duration entry from the user equipment of the calling party.

6. The method of claim 2 where in determining that the calling party is unavailable comprises:
   receiving a mobile busy response message from a cell site serving user equipment of the calling party.

7. The method of claim 2 where in determining that the calling party is unavailable comprises:
   receiving a mobile busy response message from a cell site serving user equipment of the calling party;
   playing a call waiting signal for the calling party; and
   determining that the calling party is not going to respond to the call waiting signal.

8. The method of claim 3 wherein determining the retry interval selected by the calling party comprises:
   retrieving a pre-provisioned retry interval selected by the calling party from a subscriber database of the calling party.

9. The method of claim 3 wherein determining the retry interval selected by the calling party comprises:
   sending a message to the calling party requesting the retry interval be entered through the use of the user equipment of the calling party; and,
   receiving the retry interval entry from the user equipment of the calling party.

10. A method for providing auto redial services to a calling party using mobile user equipment, the method comprising:
    receiving, at an MSC, a origination message including calling party and called party identification information;
    receiving, at the MSC, an indication that user equipment of the called party is unavailable;
    transmitting, from the MSC, a message requesting an indication as to whether an auto redial service is desired;
    receiving, at the MSC, an indication that auto redial service is desired;
    transmitting, from the MSC, a message requesting a retry duration specified by the calling party;
    receiving, at the MSC, a calling party specified retry duration;
    releasing the user equipment of the calling party for other uses;
    reattempting repeatedly, for a period of time not to exceed the calling party specified retry duration, to terminate the call to the called party;
    attempting to alert the user equipment of the calling party if one of the reattempts is successful; and,
    terminating a call between the calling party and the called party if the attempt to alert the user equipment of the calling party is successful.

11. The method of claim 10 further comprising:
    determining that the calling party is unavailable; and
    sending an announcement message to the called party explaining that the call is and auto redial call and that the calling party is now unavailable.

12. The method of claim 10 wherein reattempting to terminate the call to the called party comprises:
    receiving, at the MSC, a retry interval selected by the calling party;

generating, within the MSC, a retry signal with a period associated with the selected retry time; and, sending, from the MSC, an LAM message each time the retry signal is generated.

13. The method of claim 10 wherein receiving, at the MSC, a calling party specified retry duration comprises:

receiving, at the MSC, a pre-provisioned retry duration, selected by the calling party, from a subscriber database associated with the calling party.

14. The method of claim 10 wherein receiving, at the MSC, a calling party specified retry duration comprises:

sending a message to the calling party requesting a retry duration be entered through the use of the user equipment of the calling party; and, receiving, at the MSC, the retry duration entry from the user equipment of the calling party.

15. The method of claim 11 where in determining that the calling party is unavailable comprises:

receiving, at the MSC, a mobile busy response message from a cell site serving the user equipment of the calling party.

16. The method of claim 11 where in determining that the calling party is unavailable comprises:

receiving, at the MSC, a mobile no page response message in regard to the user equipment of the calling party.

17. The method of claim 11 where in determining that the calling party is unavailable comprises:

receiving a mobile busy response message in regard to the user equipment of the calling party;

playing a call waiting signal for the calling party; and determining that the calling party is not going to respond to the call waiting signal.

18. The method of claim 12 wherein receiving, at the MSC, a retry interval selected by the calling party comprises:

receiving, at the MSC, a pre-provisioned retry interval from a subscriber database of the calling party.

19. The method of claim 12 wherein receiving, at the MSC, a retry interval selected by the calling party comprises:

playing a message to the calling party requesting a retry interval be entered through the use of the user equipment of the calling party; and, receiving the retry interval entry from the user equipment of the calling party.

20. A system for providing auto redial services to a calling party, the method comprising:

means for receiving a call request from the calling party;

means for extracting calling party and called party identifying information from the call request;

means for attempting to terminate the call to the called party based on the extracted called party identifying information;

means for determining that user equipment of the called party is unavailable;

means for determining a retry duration selected by the calling party;

means for releasing the user equipment of the calling party;

means for starting a retry duration timer which will expire when the selected retry duration has elapsed;

means for reattempting to terminate the call to the called party until the call to the called party is successfully terminated or the retry duration timer expires;

means for successfully terminating the call to the called party; and, means for attempting to alert the user equipment of the calling party.

21. The system of claim 20 further comprising:

means for determining that the calling party is unavailable; and, means for sending an announcement message to the called party explaining that the call is an auto redial call and that the calling party is now unavailable.

22. The system of claim 20 wherein the means for reattempting to terminate the call to the called party comprises:

means for determining a retry interval selected by the calling party; and, means for reattempting with a retry frequency based on the selected retry interval.

23. The system of claim 20 wherein the means for determining a retry duration selected by the calling party comprises:

means for retrieving a pre-provisioned retry duration selected by the calling party from a subscriber database of the calling party.

24. The system of claim 20 wherein the means for determining the retry duration selected by the calling party comprises:

means for sending a message to the calling party requesting the retry duration be entered through the use of the user equipment of the calling party; and, means for receiving the retry duration entry from the user equipment of the calling party.

25. The system of claim 21 where in the means for determining that the calling party is unavailable comprises:

means for receiving a mobile busy response message from a cell site serving user equipment of the calling party.

26. The system of claim 21 where in the means for determining that the calling party is unavailable comprises:

means for receiving a mobile busy response message from a cell site serving user equipment of the calling party;

means for playing a call waiting signal for the calling party; and means for determining that the calling party is not going to respond to the call waiting signal.

27. The system of claim 22 wherein the means for determining the retry interval selected by the calling party comprises:

means for retrieving a pre-provisioned retry interval selected by the calling party from a subscriber database of the calling party.

28. The system of claim 22 wherein the means for determining the retry interval selected by the calling party comprises:

means for sending a message to the calling party requesting the retry interval be entered through the use of the user equipment of the calling party; and, means for receiving the retry interval entry from the user equipment of the calling party.

* * * * *